March 20, 1928.

H. A. SCHULTZE

TRANSMISSION MECHANISM

Filed Sept. 11, 1922

H. A. SCHULTZE

TRANSMISSION MECHANISM

Filed Sept. 11, 1922

Patented Mar. 20, 1928.

1,663,026

UNITED STATES PATENT OFFICE.

HELMUTH A. SCHULTZE, OF CHICAGO, ILLINOIS, ASSIGNOR TO FLEXO-MOTIVE CORPORATION, OF CHICAGO, ILLINOIS, A CORPORATION OF DELAWARE.

TRANSMISSION MECHANISM.

Application filed September 11, 1922. Serial No. 587,274.

My invention relates to transmission mechanism for automobiles, trucks and the like, of the sliding gear type and has for its object the provision of a construction which will enable the gears to be easily shifted for any change in speed without clashing of the gears and therefore without noise and possible damage; that is to say, my invention relates to a transmission wherein the transmission shaft, or shaft on which the shiftable gears are slidably mounted, will be relieved of its load momentarily before and during each speed change, thereby lessening the labor and skill required for operation of the transmisson mechanism.

The invention also involves the provision of a construction which may be readily applied to the present day type of automobile transmission and its shifting or operating mechanism, with all possibility of gear ratcheting or clashing made impossible.

The invention also involves the application and arrangement of means whereby the speed of rotation of the driven shaft may be determined, namely, means for operating the speedometer.

The objects and advantages of my invention will be more readily comprehended from the detailed description of the accompanying drawings, wherein:—

In the particular exemplification of the invention, the various elements of the transmission are mounted and enclosed in a suitable housing 10 which may be of the usual well known construction, formed to receive suitable bearings as at 11 at the forward end of the housing for the drive or power-imparting shaft 12 which is provided with and leads rearwardly from the usual foot-operated clutch, not shown. The inner end of the drive shaft 12 is shown counterbored to receive and provide suitable bearing for the reduced end of the transmission shaft 13 whose opposite end is mounted in suitable bearings at 14 in the opposite wall of the housing 10. This end of the transmission shaft is shown disposed through the wall of the main housing 10 and preferably enlarged and terminating in or provided with a clutch member 15. The transmission shaft 13 is also shown splined and provided with gears 16 and 17, slidably mounted thereon.

The gear 16 is shown internally toothed to receive the extended toothed or clutch portion of a gear 18 which is secured to the inner end of the drive shaft 12; the main portion of the gear 18 being arranged in constant mesh with a gear 19 keyed to the countershaft 20 suitably mounted in the lower part of the housing 10. The countershaft 20 is also shown provided with gears 21, 22 and 23 which may be integrally formed if desired or separately keyed to the countershaft.

Figure 1:
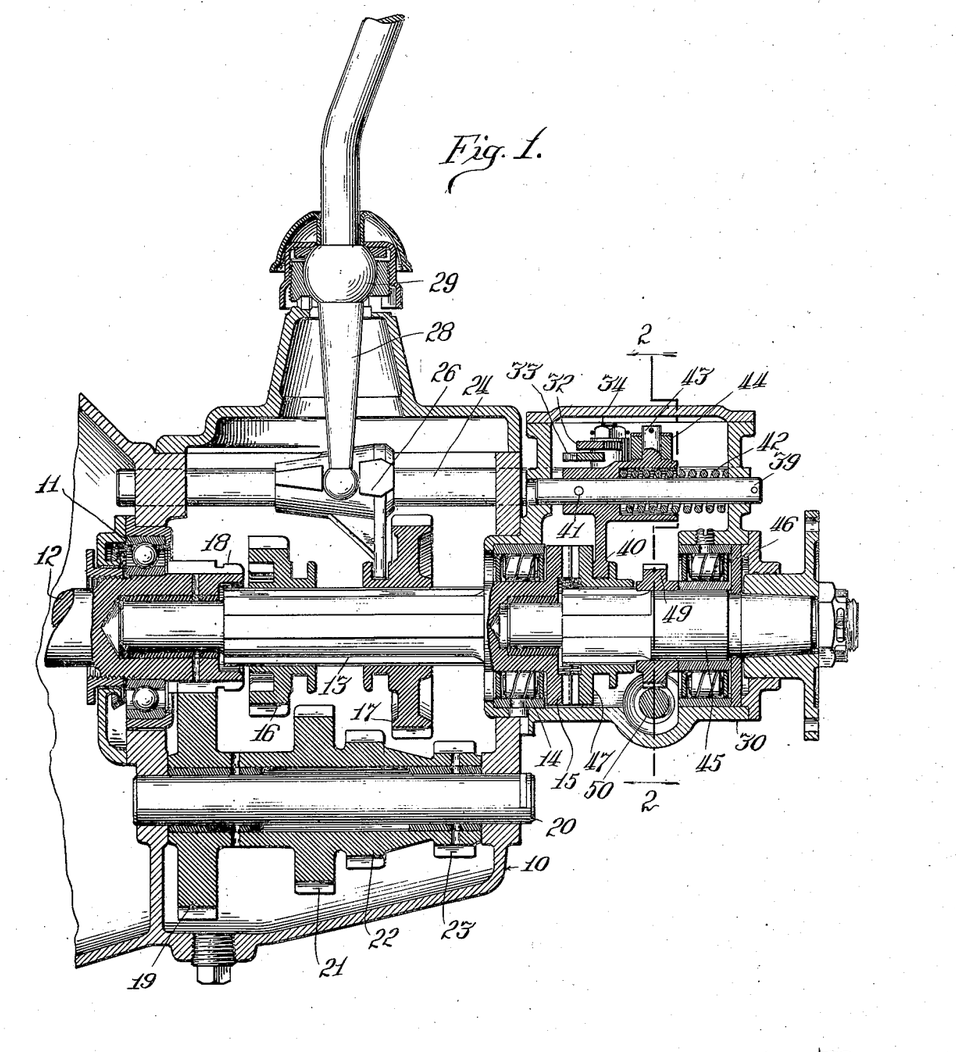
Figure 1 is a longitudinal vertical sectional view of my improved transmission and its enclosed housing or casing.
Figure 2:
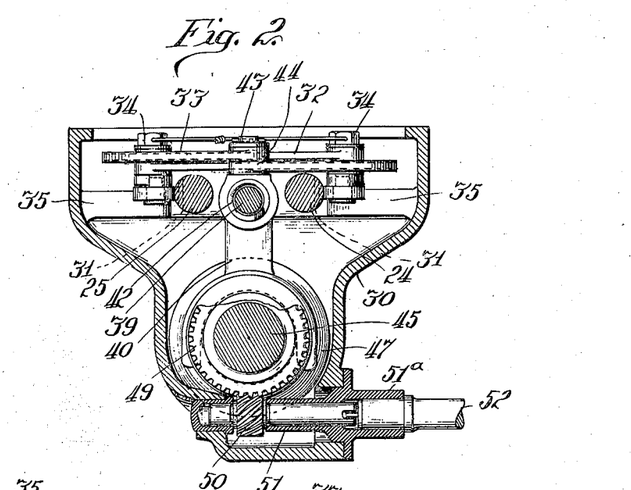
Figure 2 is a vertical cross-sectional view taken substantially on the line 2—2 of Figure 1.

The gear 16 on the transmission shaft 13 is adapted to mesh with gear 21 on the countershaft when gear 16 has been shifted to the right in Figure 1 and gear 17 on the transmission shaft 13 is adapted to mesh with gear 22 on the countershaft when gear 17 has been shifted to the left in Figure 1; the transmission mechanism, as illustrated in Figure 1, being shown in neutral or inoperative position.

Figure 6:
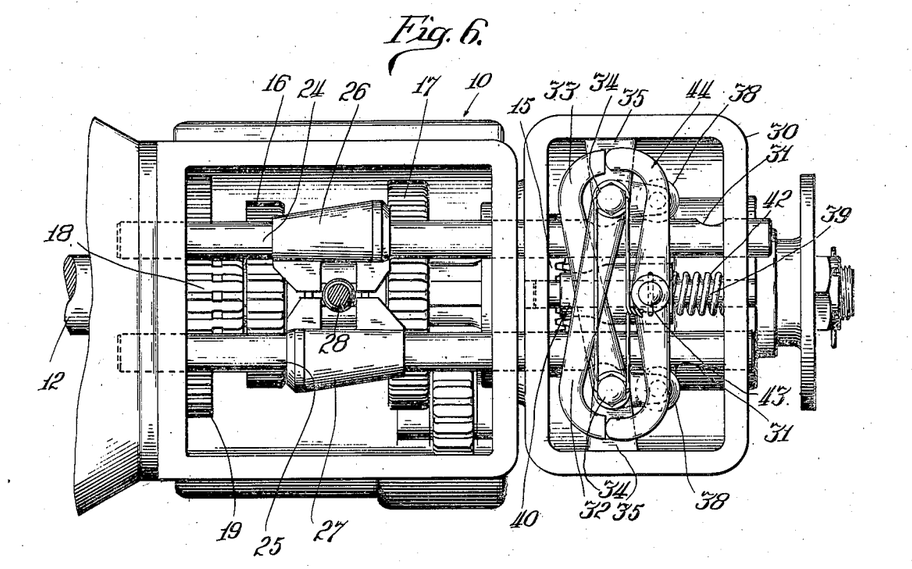
Figure 6 is a top plan view of the construction as illustrated in Figure 1 with the top of the casing removed.

The upper part of the housing 10 is provided with rods or members, for example two as shown at 24 and 25, each of which is provided with a shifting fork or element as at 26 and 27, respectively, see Figures 1 and 6. The shifting forks are slotted to receive the lower spherical end of the control lever 28 which has ball and socket mounting at 29 in a suitable dome or upward extension formed on the top or cover of the housing 10 in the usual well known manner; the control lever 28 being mounted to permit both forward and rearward oscillation as well as lateral oscillation, with the lower end disposed intermediate of the socketed portions of the shifting forks 26 and 27 and therefore in a path intermediate of the vertical planes of the rods 24 and 25.

Each fork 26 and 27 is adapted to have operative relation or controlling connection with one of the slidably mounted gears on the transmission shaft 13; for example, the shifting fork 26 has controlling relation with the gear 17, while the fork 27 is adapted to have controlling connection with the gear 16.

The forks 26 and 27 are secured to the rods 24 and 25, respectively, so as to cause the rods to be shifted or slid in a lengthwise direction; the ends of the rods being slidably mounted in the side walls of the housing.

The gear 23 on the counter shaft 20 is adapted to mesh with an idler gear (not shown) suitably mounted in the housing and adapted to be brought into operation when the gear 17 on the transmission shaft 13 has been shifted, namely to the right in Figure 1.

As the major portion of the mechanism shown enclosed in the main housing 10, and its operation is that of a well known type of transmission at present in use, further detailed description need not be entered into.

The transmission mechanism, as illustrated in the accompanying drawings, permits of three forward speeds and a reverse, which speed changes are effected by either shifting the gears 16 or 17 on the transmission shaft. Shifting gear 16 to the left in Figure 1 sufficiently to induce the extended portion of gear 18 on the drive shaft to mesh with the internal toothed portion of gear 16, causes the transmission shaft 13 to be directly coupled to the drive shaft 12; and therefore to rotate at the same speed; or shifting gear 16 to the right on the transmission shaft 13, as disclosed in Figure 1, will cause gear 16 to mesh with gear 21 on the countershaft; and as the countershaft is in constant rotation by reason of gear 19 thereon being in constant mesh with the gear 18 on the drive shaft, the transmission shaft 13 will be rotated at a different speed from that induced when it is directly connected with the drive shaft 12 as previously stated. Upon shifting gear 17 on the transmission shaft 13 to the left in Figure 1, it will be brought into mesh with gear 22 on the countershaft and therefore the transmission shaft will be driven at a lesser speed because of the different gear ratios; while shifting of gear 17 to the right in Figure 1 is presumed to bring it into mesh with an idler gear (not shown) which is constantly meshing with gear 23 on the countershaft, thereby causing transmission shaft 13 to be rotated in opposite or reverse direction.

The rear of the housing 10 may either be extended or provided with an extension or auxiliary housing of suitable construction as illustrated at 30 which is adapted to receive the outer or clutch end 15 of the transmission shaft 13 and also to receive the extended ends of the fork-carrying slide rods, namely rods 24 and 25. Each of the slide rods is shown provided with a plurality of grooves or sockets as at 31 and 31ª arranged at predetermined points and in spaced relation corresponding with the degree of movement necessary for shifting the respective gears on the transmission shaft into their various operative positions; the depressions or sockets 31 and 31ª in the particular exemplification of the invention being shown arranged along the sides of the slide-rods.

Figure 7:
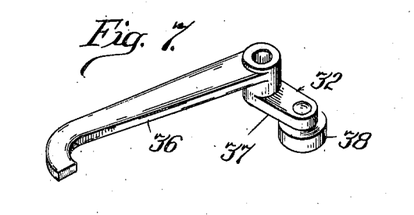
Figure 7 is a detail view in perspective of one of the elements of the rear clutch controlling mechanism.

Suitably mounted in the auxiliary housing 30 and preferably intermediate of the fork-carrying slide rods and the side walls of the housing I provide the controlling members or levers 32 and 33; the levers being pivotally mounted to swing about their pivot points 34 formed by suitable lugs or brackets at 35 in the housing so that the short ends of the levers or controlling members may oscillate horizontally or rather in directions toward and away from the fork-carrying slide rods 24 and 25, respectively. The levers or controlling members may each be of single piece construction or the two portions or arms of the lever so secured as to move together and in view of the fact that these controlling members or levers are preferably intended to be in lapping relation with each other and disposed across the tops of the fork-carrying slide rods, the levers 32 and 33 are offset so that the long arms 36 of the controlling members 32 and 33 are disposed from the upper sides of the short arms 37, see Figure 7; while the long arm of the one member, say lever 32, is preferably farther from the upper side of the short arm thereof in order that the two long arms of both levers 32 and 33 may be in close lapping relation.

The short arms 37 of the levers 32 and 33 are each preferably provided with a small roller or friction reducing element as at 38 which is adapted to ride along the grooved or socketed side of the respective fork-carrying slide rod; the roller 38 being adapted to ride into the grooves or sockets of the slide rods when the latter have been shifted into a speed change position, thereby bringing a groove or socket into register with the free end or roller-carrying portion of the short arms of the respective levers. As is clearly shown in Figures 3 to 6, the levers 32 and 33 are arranged so that the long arms thereof extend transversely of the fork-carrying slide rods and in opposite directions.

Figure 8:
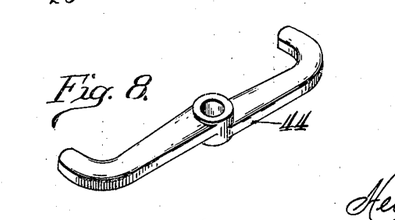
Figure 8 is a detail view in perspective of a second element employed in the rear clutch controlling mechanism.

Slidably mounted in the auxiliary housing 30 at a point intermediate of the fork-carrying slide rods 24 and 25, I provide a rod 39 which is provided with a shifting fork 40 which is preferably secured to the rod, as by means of the pin 41, so as to cause the rod 39 and the fork 40 to move together. The hub of the fork 40 through which the rod 39 extends is preferably counterbored to receive the end of a coil spring 42 whose opposite end is shown bearing against the side of the housing 30; the spring 42 normally tends to force the rod 39 with fork 40 toward the left in Figure 1; that is to say toward the end of the transmission shaft which extends into the auxiliary housing 30. The hub of the shifting fork 40 is shown provided with an upwardly disposed lug or pin as at 43 on which is oscillatably mounted a bell-crank member or lever 44. The bell-crank lever or member 44 is preferably of the construction more clearly shown in Figure 8, that is to say with the arms of the lever preferably radiating from the hub portion in different horizontal planes, namely with the one arm in a plane slightly above that of the other in order that the one arm of lever 44 may extend and lie in the same plane as the long arm 36 of lever 32, while the other arm of the bell-crank lever 44 extends in the same plane as the long arm 36 of the lever 33. When the levers 32, 33 and 44 are in normal position, or rather when the transmission is in neutral position, the ends of the long arms of levers 32 and 33 will be substantially in alignment with the pivotal points of the levers and therefore substantially parallel with each other as shown in Figure 6; with the ends of the bell-crank lever 44 bearing against the ends of the long arms of levers 32 and 33.

Figure 3:
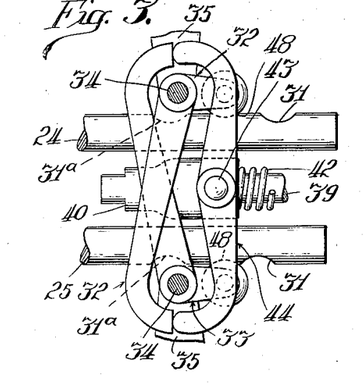
Figure 3 is a detail plan view of a portion of a rear clutch controlling mechanism shown in neutral position.

The clutch end 15 of transmission shaft 13 is shown counterbored to receive suitable anti-friction bearings and the reduced end of the driven shaft 45 which is disposed through the auxiliary housing and provided with suitable bearings as at 46. The inner end of the driven shaft 45 is splined and provided with a clutch member 47 which is adapted to engage with the clutch member 15 formed on or secured to the adjacent end of the transmission shaft 13 and with which the driven shaft is in axial alignment. The slidable clutch member 47 is controlled by the fork 40, whereby clutch member 47 is moved lengthwise of the driven shaft 45 either into or out of intermeshing or clutching relation with the clutch element or member 15 secured to the transmission shaft 13. As is apparent from the construction shown, the spring 42 exerts constant pressure on the fork 40 in a direction tending to shift clutch member 47 into clutching engagement with clutch member 15; the clutch shifting fork 40, however, is controlled by the position of the bell-crank lever 44 which in turn is controlled by the long arms of the levers 32 and 33; that is to say, when the ends of the long arms of levers 32 and 33 are substantially in alignment as shown in Figures 3 and 6, the bell-crank lever 44 will be held against tilting or oscillation and therefore will cause the fork 40 to be held against the action of spring 42.

Figure 4:
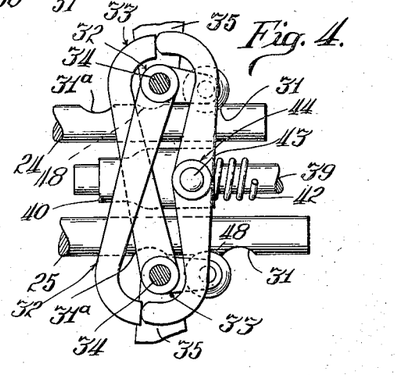
Figure 4 is a similar view of the mechanism showing its position when the transmission has been shifted into one of the speed changes.

If the transmission control lever 28 is oscillated and brought into operative engagement with the shifting fork 26 and the latter moved to the left in Figures 1 and 6, gear 17 on transmission shaft 13 will be shifted into mesh with gear 22 on the countershaft. This will also cause rod 24 to be shifted to the left, thereby moving the groove or socket 31 at the right hand end or rod 24 into position for the roller-carrying end of arm 37 of the lever 32, allowing the roller to enter the groove or socket, which will permit lever 32 to oscillate on its pivotal point so as to swing the long arm outwardly as shown in Figure 4. As the fork member 40 on which the bell-crank lever 44 is pivoted, is under constant spring pressure, the bell-crank lever therefore is also yieldingly held against the long arms of the levers 32 and 33. As a result of the outward movement of the long arm of lever 32, as shown in Figure 4, the resistance offered by the bell-crank lever 44, to fork member 40, is released and the fork member 40 with rod 39 permitted to move to the left in Figures 1 and 6 sufficiently to bring the clutch 47 into clutching engagement with clutch member 15, thereby coupling the driven shaft 45 to the transmission shaft. As is apparent from the construction shown, complete clutching engagement between members 47 and 15 can only take place when the short arm of the lever 32 has entered one of the sockets or grooves in the slide rod 24, namely a position induced by a sufficient shifting in either direction of the fork-carrying slide-rod 24 necessary for shifting gear 17 into mesh either with the gear 22 on the countershaft or an idler gear (not shown) for inducing reverse operation; such positioning of the gear 17 producing either first (low) speed or reverse, as the case may be.

Figure 5:
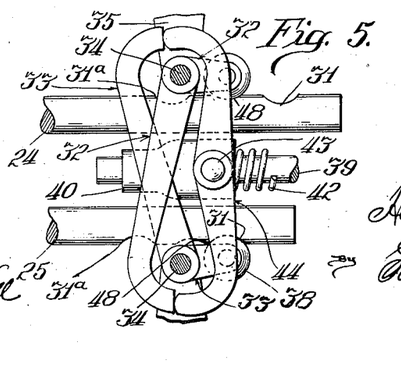
Figure 5 is a similar view of the mechanism in a position resulting when the transmission is shifted to provide another speed change.

If the control lever 28 is oscillated so as to engage with the shifting fork 27 secured to slide rod 25 and the lever sufficiently operated to shift gear 16 on the transmission shaft 13 to the left in Figure 1, the transmission shaft will be directly coupled to the drive shaft 12 and the groove or socket 31 on the slide-rod 25 will be positioned to receive the roller or short arm of lever 33. This will permit the lever 33 to oscillate about its pivotal point and the long arm thereof allowed to move to the left in the mechanism as viewed in Figure 6, which therefore permits the bell-crank lever 44 to shift from its normal position and allows slight shifting movement of rod 39 with fork 40 (due to the pressure spring 42 and positioning the mechanism as illustrated in Figure 5) which forces the clutch member 47 into clutching engagement with clutch member 15, whereby the driven shaft 45 is placed in operative relation with or coupled to the transmission shaft 13.

It is apparent that movement of operating of control lever 28 in the opposite direction while in engagement with shifting fork 27, will cause gear 16 to be slid lengthwise of transmission shaft 13 and into mesh with gear 21 on the countershaft, producing an intermediate speed, at which time the socket or groove 31$^a$ will be positioned to receive the roller on the short arm of lever 33. This will permit oscillation of lever 33 and allow movement of bell-crank lever 44 and fork 40, so that operative relation between the transmission shaft 13 and driven shaft 45 will be provided after gear 16 has been shifted for the intermediate speed, produced from the driveshaft 12 through its gear 18 and gears 19 and 21 on countershaft 20 and through gear 16 to the transmission shaft which in turn transmits rotation to the driven shaft 45 by the clutch members 15 and 17.

As is apparent from the construction shown and described, the transmission shaft 13 is placed out of operative relation with the driven shaft 45, and is therefore relieved of the load or momentum of the vehicle during each speed change; the transmission shaft being entirely free from load while the gears are being shifted, inasmuch as the drive shaft 12 is usually disconnected from the engine or crank-shaft during shifting of the transmission gears, through manipulation of the usual foot controlled front clutch (not shown). As a result of my invention, the shifting of the gears on the transmission shaft and their engagement with the gears on the countershaft or with the clutch gear on the drive shaft may be smoothly and easily effected without clashing and the resultant noise and damage frequently encountered with transmissions at present in use; the shifting from one speed to another, in either direction, being readily and easily carried out while the vehicle is traveling at a considerable speed.

In order to facilitate the shifting of the gears from a neutral position into any of the desired speeds, it may be desirable to keep the transmission shaft in motion, especially when "coasting" or running under the momentum of the vehicle, and for that reason I show the slide rods 24 and 25 each provided with a shallow groove or notch 48 intermediate of the deep grooves 31 and 31$^a$. When the slide rods 24 and 25 have been shifted so as to move all of the slidable gears out of meshing relation, the grooves 48,—intermediate of and slightly spaced apart from the deeper grooves 31 and 31$^a$,—will be in position to receive the rollers on the ends of the short arms of the levers 32 and 33 and allow slight tilt of the long arms of levers 32 and 33 sufficient to permit slight advancing movement by lever 44 and therefore of rod 39 and its clutch fork or arm 40. As a result of this movement of said elements, clutch member 47 will be allowed to partially seat or form initial clutching engagement, say to about one-sixteenth of an inch, sufficient to keep the transmission shaft and its gears in motion to facilitate shifting of the gears into complete meshing relation without ratcheting.

It is apparent, however, that a neutral or non-driving relation between transmission shaft and the driven shaft is obtained momentarily in advance of the shifting of the gears, either into or out of meshing relation.

The housing 30 in which the driven shaft section 45 is located also houses the speedometer driving mechanism which comprises a suitable worm gear 49, secured to the driven-shaft section 45, arranged in mesh with a worm 50 rotatably mounted in a two part sleeve 51 removably secured in the lower part of the auxiliary housing 30.

The one part of sleeve 51 is preferably closed at one end, adapted to hold lubricant; while the opposite end of the other part of the sleeve is shown flanged to abut against the side of the housing 30 and also has an enlarged end or hub portion 51$^a$ to receive the end of a small shaft 52 with which the end of worm shaft 50 has operative relation which permits of easy assembly and dissociation; while the part of sleeve 51 provides ample bearing for the worm-shaft 50 to permit easy operation and proper lubrication.

While the transmission illustrated in the drawings merely discloses three speeds forward and one reverse, it is evident that any number of speed changes may be provided and that the respective shifting, fork-carrying slide-rods may be provided with a number of grooves or sockets corresponding with the number of speed changes effected by the slide-rod, or the number of gears controlled thereby; it being understood that the grooves or notches in the slide-rods are positioned and spaced apart in a predetermined manner; the deep grooves corresponding to the distance of travel of the sliding gears necessary to effect a speed change and the shallow grooves arranged intermediate of the deep grooves; while at the same time sufficient spacing between the respective grooves or notches is provided to constantly produce a momentary declutching or dissociation of the clutch members 15 and 47 during shifting of the slide-rods with their gears into the different speed producing positions.

I have shown a simple adaptation of my invention, which has been described in terms employed merely as terms of description and not as terms of limitation, as structural modifications are possible and may be made without, however, departing from the spirit of my invention.

What I claim is:—

1. In a transmission, a transmission shaft, an aligned driven shaft section, a clutch whereby the two shafts may be operatively connected, cooperating transmission gears for providing different speed changes, certain of said gears being slidably mounted, slide-rods operatively connected with the slidable gears and provided with actuating surfaces correlated to the speed change positions of the slidable gears, spring controlled means whereby said clutch is forced into clutching position, and means arranged to control said spring controlled means and caused to operate by the actuating surfaces of the slide-rods whereby said clutch effects clutching condition when the slidable gears are positioned to provide the desired speed change.

2. In a transmission provided with a transmission shaft, cooperating transmission gears for providing different speed changes, some of which gears are movable into and out of operative position, and an aligned driven shaft, coupling mechanism between said shafts, with a portion of the mechanism movable into and out of coupling position, slide rods having operative connection with the movable gears, said rods being provided with actuating surfaces at prearranged points correlated to the speed change producing positions of the movable gears, pressure means adapted to force the movable portion of the coupling mechanism into shaft coupling position, and means intermediate of the slide rods and said pressure means whereby the latter is permitted to operate when the actuating surfaces of a slide rod is brought to register with said last means.

3. In a transmission mechanism, the combination of a drive shaft, a transmission shaft, a driven shaft, all arranged in axial alignment, and a countershaft, gears on the drive shaft, transmission shaft and countershaft, for effecting different speeds between the drive shaft and the driven shaft, certain of the gears being slidably mounted, slide rods adapted to shift the slidable gears, said rods being provided with sockets spaced apart lengthwise of the rods at points correlated to the meshing positions of the slidable gears, clutch mechanism intermediate of the transmission shaft and the driven shaft, spring pressed means operatively connected with the clutch mechanism, and means intermediate of the slide rods and said spring pressed means with a portion of said means being held in contact with said slide rods, whereby the clutch mechanism is caused to move into complete clutching position when a slide rod is positioned where it effects a speed change.

4. In transmission mechanism, the combination of a drive shaft, a transmission shaft, a countershaft and a driven shaft, different speed change producing elements arranged on the drive shaft, countershaft and transmission shaft, the elements on one of the shafts being movable into and out of operative relation with the elements on the other shafts, a plurality of slidably mounted members for controlling the movable elements, a clutch intermediate of the transmission shaft and the driven shaft for producing operative relation between the two shafts, means normally tending to move said clutch into clutching position, and means having operative relation with said last mentioned means and with the slidably mounted members, whereby said last mentioned means is held against operation during movement of the movable elements, while operation of said last mentioned means is permitted when any one of the movable elements has been placed in intermeshing position.

5. In a transmission mechanism, a transmission shaft, a countershaft and a driven shaft, cooperating transmission gears for providing different speed changes, a portion of the gears being shiftable into meshing relation with the other gears, slidably mounted gear-shifting members adapted to move in a direction lengthwise of the transmission shaft and the driven shaft, a clutch intermediate of the transmission shaft and the driven shaft for effecting operative relation between the two shafts, a spring pressed slidably mounted clutch controlling member arranged parallel with the driven shaft, means disposed intermediate of the slidably mounted gear shifting members and said spring pressed clutch controlling member, a portion whereof is held in contact with the gear shifting members through the action of the spring pressed clutch controlling member, said last mentioned means being caused to move when the shifting members reach predetermined points in their travel and the clutch thereby permitted to move into shaft coupling position.

6. In a transmission mechanism, the combination of a transmission shaft and a driven shaft, speed change producing gears, a portion of said gears being slidable into operative position, a clutch interposed between said shafts for effecting operative relation between said shafts, slidably mounted gear shifting members arranged parallel with the driven shaft and provided with actuating surfaces correlated to the operative positions of the gears, spring actuated means normally tending to move said clutch into clutching position, and means held in operative relation with the gear shifting members by said spring actuated means whereby the spring actuated means with the clutch are held out of clutch effecting position until a gear shifting member has reached a predetermined position.

7. In a transmission mechanism, a drive shaft, a transmission shaft, a driven shaft, all arranged in axial alignment, a countershaft, speed change producing gears on the drive shaft, countershaft and transmission shaft, with certain of said gears being shiftable into and out of operative position, slidably mounted rods for controlling said shiftable gears and arranged to extend parallel with the driven shaft, with the extended portions of said rods being provided with sockets at predetermined points, a clutch intermediate of the transmission shaft and the driven shaft for operatively connecting the two shafts, spring actuated means whereby the clutch is normally moved into clutching position, and pivoted means affected by the spring actuated means whereby said means are held against movement until the sockets of the slide rods are positioned to receive the pivoted means and a speed change has been effected.

8. In a transmission mechanism, the combination of a transmission shaft, a driven shaft, a clutch for operatively connecting the two shafts, cooperating gears selectively engageable with each other to produce different speeds, slide rods for shifting certain of the gears, provided with actuating surfaces, slidably mounted means for controlling the clutch, a plurality of levers pivoted intermediate of their ends, one of said levers being under spring pressure and operatively connected with said clutch controlling means, while the other levers are each interposed between one end of said first lever and a slide-rod, whereby the first mentioned lever and the clutch controlling means are held against movement until an actuating surface on a slide-rod is positioned to affect one of the last mentioned levers.

9. In a transmission mechanism, the combination of a transmission shaft, a driven shaft, a countershaft, a clutch interposed between the transmission shaft and the driven shaft, cooperating gears on the transmission shaft and countershaft selectively engageable with each other for producing different speeds, a plurality of slide rods for controlling the shiftable gears, said rods being provided with sockets at predetermined points, spring pressed means normally tending to move the clutch into shaft coupling position, and means held in contact with the slide rods by said spring pressed means whereby the clutch is held in non-clutching position until a socket of any one of the slide-rods is brought to register with said last means.

10. In a transmission mechanism, the combination of a drive shaft, a transmission shaft, a driven shaft, all arranged in axial alignment, a countershaft, cooperating gears on the drive shaft, transmission shaft and countershaft, certain of said gears being shiftable into and out of operative position, a slidably mounted element for each shiftable gear, a clutch intermediate of the transmission shaft and the driven shaft, spring pressed means for controlling said clutch, and a plurality of pivoted members, one of said members being carried by said spring pressed means and adapted to hold the other members in operative relation with the slidably mounted elements, whereby the clutch is held in open position during movement of any one of said slidably mounted elements.

11. In a transmission mechanism, the combination of a drive shaft, a countershaft, a transmission shaft, a driven shaft, a clutch interposed between the transmission shaft and driven shaft, cooperating gears on the drive shaft, countershaft and transmission shaft for providing different speeds, the gears on the transmission shaft being shiftable into and out of meshing position, a plurality of slidably mounted gear shifting rods provided with sockets at points correlated to the meshing positions of the gears, a spring actuated clutch controlling member, and a plurality of pivoted members intermediate of said clutch controlling member and said gear shifting rods whereby the clutch moves into shaft coupling position when a socket on the rods is positioned to receive a portion of the pivoted members.

12. In a transmission mechanism, the combination of a drive shaft, a countershaft, a transmission shaft, a driven shaft, a clutch intermediate of the transmission shaft and driven shaft, co-operating gears on the drive shaft, countershaft and transmission shaft for effecting different speed changes, with the gears on the transmission shaft being slidable into and out of meshing position, a plurality of gear-shifting slide rods, spring-actuated means for controlling said clutch, and means intermediate of said spring-actuated means and all of said slide-rods whereby said clutch is moved into open position when said slide-rods are actuated.

13. In a transmission mechanism, a drive shaft, a countershaft, a transmission shaft, a driven shaft, a clutch interposed between the transmission shaft and the driven shaft, cooperating gears on the drive shaft, countershaft and transmission shaft for effecting different speed changes, certain of said gears being slidably mounted, a plurality of gear shifting slide rods having actuating surfaces at predetermined points, a clutch controlling member, and means mounted intermediate of the clutch controlling member and the slide rods and yieldingly held in contact with the latter whereby movement of said means is induced when the actuating surfaces of any one of the slide rods are brought to register with said means and the clutch thereby caused to move into clutching position.

14. In a transmission, the combination of a transmission shaft, a driven shaft, a clutch for operatively connecting the two shafts, cooperating gears selectively engageable with each other to produce different speeds, slide-rods for shifting certain of the gears, said rods being provided with sockets corresponding with the number of speed changes effected by said slide-rod, a spring pressed slidable element for forcing the clutch into clutching position, a lever pivotally mounted intermediate of its ends on said element, a lever intermediate of each end of the first lever and a slide-rod, with one end of each of the last mentioned levers bearing against the socketed face of a slide-rod, whereby the spring pressed element and the clutch are held against movement until a socket on a slide-rod is brought to register with the end of one of the last mentioned levers.

15. In a transmission mechanism, the combination of a transmission shaft, a driven shaft, gears slidable on the transmission shaft for effecting speed changes, a clutch member secured to the end of the transmission shaft, a second clutch member secured to the adjacent end of the driven shaft, slide-rods for shifting said slidable gears, slidable means for actuating one of the clutch members, and composite means intermediate of the slide-rods and said slidable means whereby the latter is actuated when the slide-rods reach predetermined positions.

16. In a transmission mechanism, the combination of a housing, a transmission shaft, a driven shaft section, both rotatably mounted in said housing, gears slidable on said transmission shaft, a clutch member secured to one end of the transmission shaft adjacent to the driven-shaft section, a second clutch member secured to the driven shaft section, gear-shifting slide-rods in said housing and provided with spaced grooves or sockets at points correlated to the degree of movement of the slidable gears, clutch-operating mechanism slidable in the housing intermediate of the slide-rods, and composite lever mechanism intermediate of said clutch-operating mechanism and the socketed sides of the slide-rods whereby operative engagement of the clutch members is permitted when the slide-rods are in predetermined positions.

17. In a transmission mechanism, the combination of a drive shaft, a countershaft, a transmission shaft, a driven shaft, a clutch intermediate of the transmission shaft and driven shaft, cooperating gears on the drive shaft, countershaft and transmission shaft for effecting different speed changes, certain of the gears being slidable into and out of operative position, gear shifting slide rods provided with actuating surfaces at points correlated to the speed change positions of the gears, means for controlling said clutch, and composite lever mechanism tiltably mounted intermediate of said clutch controlling means and the actuating surfaces of the slide-rods, portions of said lever mechanism being in constant operative contact with said slide-rods to be actuated by the surfaces on the slide-rods, whereby partial engagement of the clutch is effected when certain of the actuating surfaces on the slide-rods are in register with the lever mechanism and complete engagement of the clutch is effected when other actuating surfaces on said slide rods are in register with the lever mechanism, while a declutching of the clutch is effected during shifting of the slide-rods.

18. In a transmission mechanism, a transmission shaft, a driven shaft, a clutch for operatively connecting the two shafts, cooperating gears for producing different speed changes, gear-shifting slide-rods, means whereby said clutch is controlled, and means intermediate of each gear-shifting slide-rod and said first means whereby the latter is controlled and the clutch held open while the slide-rods are effecting speed changes.

19. In a transmission mechanism, the combination of a transmission shaft, a driven shaft, a clutch for operatively connecting the two shafts, cooperating gears, selectively engageable with each other to produce different speeds, slidable elements for shifting a predetermined number of said gears, means for actuating said clutch, and means intermediate of said last means and said slidable elements whereby said clutch is held open during movement of the slidable elements.

20. In a transmission mechanism, the combination of a transmission shaft, a driven shaft, a clutch for operatively connecting the two shafts, cooperating gears, selectively engageable with each other to produce different speeds, slide rods for shifting certain of said gears, each of said slide rods being provided with actuating surfaces corresponding in number with the number of speed changes effected thereby, and clutch controlling means intermediate of said clutch and said slide rods whereby the clutch is maintained in open position until said actuating surfaces reach predetermined positions relative to said clutch controlling means.

21. A transmission comprising, in combination with a housing provided with a transmission shaft, a countershaft, cooperating gears selectively engageable with each other to produce different speeds and slide-rods for controlling the shiftable gears, a supplemental housing adapted to be secured to one end of the first housing and arranged to receive the ends of the transmission shaft and said slide-rods, the ends of the slide-rods in the supplemental housing being provided with sockets corresponding with the number of speed changes effected by each slide-rod, a driven shaft mounted in said supplemental housing in alignment with the transmission shaft, a clutch member secured to the end of the transmission shaft, a second clutch member slidably secured to the end of the driven shaft, spring controlled means for actuating said second mentioned clutch member, and means intermediate of the spring controlled means and the socketed portions of the slide-rods whereby the spring-controlled means and the second mentioned clutch member are held against movement until a socket in a slide-rod is brought into register with said last means.

22. In a motor vehicle transmission, the combination with a motor driven change-speed gear set comprising a plurality of shifter rods, and an auxiliary clutch operatively connecting said gear set to a driven means, of means actuated by one of said shifter rods for effecting disengagement of said auxiliary clutch.

23. In a motor vehicle transmission mechanism, the combination with a motor driven change-speed gear set comprising a plurality of shifter rods, and an auxiliary clutch operatively connecting said gear set to a driven means, of a single means actuated by said shifter rods for actuating said auxiliary clutch.

24. In a motor vehicle transmission mechanism, the combination with a motor driven change-speed gear set comprising a plurality of shifter rods, and an auxiliary clutch operatively connecting said gear set to a driven means, of a single means actuated by one of said shifter rods for moving said auxiliary clutch to its open position, and resilient means for reclosing the same.

25. Transmission mechanism for a motor driven vehicle comprising in combination, a pair of gear shifter rods, means for operating them, a transmission shaft, a differential drive shaft, means for rotatively connecting and disconnecting said shafts, means controlled by the movement of either shifter rod to a neutral position for positively disconnecting them and automatic means for connecting them when either shifter rod is moved to engaged position.

26. Transmission mechanism for a motor driven vehicle comprising in combination, a pair of gear shifter rods, means for operating them, a transmission shaft, a differential drive shaft, means for rotatively connecting and disconnecting said shafts, means controlled by the movement of either shifter rod to a neutral position for positively disconnecting them and automatic means for gradually connecting them when either shifter rod is moved to engaged position.

27. Transmission mechanism for a motor driven vehicle comprising in combination, a pair of gear shifter rods, means for operating them, a transmission shaft, a differential drive shaft, means including a movable member for rotatively connecting or disconnecting said shafts, means positively operated by either gear shifter rod in moving from mesh to neutral position for so moving said member as to cause disconnection and for releasing it when moved from neutral into mesh and means for automatically causing said member to move to connected position when released.

28. In a transmission gearing, the combination with shiftable speed changing elements, and means for shifting said elements, including parts individual to the shiftable elements and operable independently of each other, of a clutch including a shiftable member, shiftable out of and into engaging position during each speed shifting operation, and means operable by any one of said parts for shifting the clutch member.

29. In a transmission gearing, the combination with shiftable speed changing elements, and means for shifting said elements, comprising endwisely movable shifting rods for said elements said rods being operable independently of each other, of a clutch shiftable into and out of engaging position, during the shifting of any one of said elements, and means operable by said rods for shifting the clutch member.

30. In a transmission gearing comprising driving and driven shafts, the driven shaft having an extension, shiftable speed changing elements between the driving and driven shafts for providing selective speed changes and a clutch including a shiftable section between the driven shaft and its extension, means for shifting said element comprising an endwisely movable rod operatively connected with said element and provided with actuating surfaces correlated to the shifting positions of said rod, spring controlled means operable by the actuating surfaces on said rod for shifting the shiftable section of the clutch between the driven shaft and its extension, and a plurality of tiltably mounted members intermediate of said spring controlled means and the endwise movable rod adapted to have operative relation with each other when one of said members is engaged by an actuating surface on said rod.

31. In a transmission gearing, the combination with shiftable speed changing elements, and means for shifting said elements, comprising endwisely movable shifting rods for said elements, of a clutch shiftable into and out of engaging position, during the shifting of any one of said elements, and means operable by said rods for shifting the clutch member, said rods having means for positively operating the clutch, shifting means to shift the clutch member into engaging position, and said shifting means for the clutch member including a spring for yieldingly moving the clutch member into engaging position.

32. In combination with a transmission gearing, comprising shiftable speed changing elements, and means for shifting said elements, including parts individual to said elements, and operable independently of each other, said parts being formed with cam surfaces, of a clutch including a member shiftable out of and into engaging position during the shifting of each element, and means for shifting the clutch, comprising a motion transmitting member having followers coacting with the cam surfaces of said parts, whereby said member is moved in one direction by the cam surface of the part shifted, and a spring acting upon the motion transmitting member to move it and the clutch member in the opposite direction into engaging position.

HELMUTH A. SCHULTZE.